United States Patent
Mayes

(10) Patent No.: US 12,225,022 B2
(45) Date of Patent: *Feb. 11, 2025

(54) SYSTEMS AND METHODS FOR SECURE COMMUNICATION IN CLOUD COMPUTING ENVIRONMENTS

(71) Applicant: Capital One Services, LLC, McLean, VA (US)

(72) Inventor: Paul Ellis Mayes, McLean, VA (US)

(73) Assignee: Capital One Services, LLC, McLean, VA (US)

(*) Notice: Subject to any disclaimer, the term of this patent is extended or adjusted under 35 U.S.C. 154(b) by 571 days.

This patent is subject to a terminal disclaimer.

(21) Appl. No.: 17/506,186

(22) Filed: Oct. 20, 2021

(65) Prior Publication Data
US 2022/0038476 A1 Feb. 3, 2022

Related U.S. Application Data

(63) Continuation of application No. 16/655,839, filed on Oct. 17, 2019, now Pat. No. 11,159,544, which is a
(Continued)

(51) Int. Cl.
*H04L 29/06* (2006.01)
*H04L 9/40* (2022.01)

(52) U.S. Cl.
CPC ...... *H04L 63/1416* (2013.01); *H04L 63/0236* (2013.01); *H04L 63/1408* (2013.01); *H04L 63/1433* (2013.01)

(58) Field of Classification Search
CPC ............. H04L 63/1416; H04L 63/0236; H04L 63/1408; H04L 63/1433
See application file for complete search history.

(56) References Cited

U.S. PATENT DOCUMENTS

| 7,424,744 B1 * | 9/2008 | Wu | H04L 63/0263 |
| | | | 713/153 |
| 7,596,097 B1 * | 9/2009 | McCowan | H04L 43/00 |
| | | | 370/359 |

(Continued)

FOREIGN PATENT DOCUMENTS

| CN | 102210133 A | * | 10/2011 | ......... H04L 63/0227 |
| CN | 102474532 A | * | 5/2012 | ....... H04L 29/12933 |

(Continued)

*Primary Examiner* — Sher A Khan
(74) *Attorney, Agent, or Firm* — Foley & Lardner LLP

(57) ABSTRACT

Disclosed embodiments provide systems, methods, and computer-readable storage media for secure data communication between two devices. A disclosed system responds to a request from an originating communication device in a first network to connect with a communication device in a second network, for communication, by receiving a request from the communication device in the first network, the request including payload data and a destination network address in the second network. The system then transmits the received payload data to the destination address in the second network after analyzing the payload data for network intrusion. When the analysis does not indicate network intrusion, the system determines a route to the destination network address by looking up the destination address in a routing table and forwarding the payload data to the destination network address in the second network. If the analysis indicates network intrusion, the system discards the payload data.

20 Claims, 4 Drawing Sheets

Related U.S. Application Data continuation of application No. 16/253,427, filed on Jan. 22, 2019, now Pat. No. 10,491,613.

(56) References Cited

U.S. PATENT DOCUMENTS

| | | | |
|---|---|---|---|
| 9,369,433 B1* | 6/2016 | Paul | H04L 63/029 |
| 9,560,058 B2* | 1/2017 | Kako | H04L 12/185 |
| 10,015,136 B2* | 7/2018 | Arkko | H04W 12/086 |
| 10,484,334 B1* | 11/2019 | Lee | H04L 67/30 |
| 10,491,613 B1* | 11/2019 | Mayes | H04L 63/0236 |
| 10,609,206 B1* | 3/2020 | Dannamaneni | H04L 65/765 |
| 2002/0032766 A1* | 3/2002 | Xu | H04L 67/564 |
| | | | 709/201 |
| 2002/0032798 A1* | 3/2002 | Xu | H04L 61/00 |
| | | | 709/249 |
| 2003/0070095 A1* | 4/2003 | Okamoto | H04L 63/029 |
| | | | 709/227 |
| 2003/0105881 A1* | 6/2003 | Symons | H04L 63/0236 |
| | | | 370/911 |
| 2003/0154306 A1* | 8/2003 | Perry | H04L 61/00 |
| | | | 709/239 |
| 2005/0286522 A1* | 12/2005 | Paddon | H04L 63/102 |
| | | | 370/389 |
| 2007/0192862 A1* | 8/2007 | Vermeulen | H04L 63/1441 |
| | | | 726/23 |
| 2008/0162239 A1* | 7/2008 | Mitchell | G06Q 10/087 |
| | | | 709/200 |
| 2010/0125900 A1* | 5/2010 | Dennerline | H04L 63/0227 |
| | | | 726/13 |
| 2011/0214157 A1* | 9/2011 | Korsunsky | H04L 63/1458 |
| | | | 726/1 |
| 2013/0058224 A1* | 3/2013 | Jansen | H04L 61/35 |
| | | | 370/254 |
| 2014/0029474 A1* | 1/2014 | Bhagavatula | H04L 12/1827 |
| | | | 370/260 |
| 2014/0143854 A1* | 5/2014 | Lopez | H04L 63/0218 |
| | | | 726/14 |
| 2014/0245423 A1* | 8/2014 | Lee | H04L 63/20 |
| | | | 726/12 |
| 2015/0163199 A1* | 6/2015 | Kailash | H04L 63/1425 |
| | | | 726/11 |
| 2015/0264069 A1* | 9/2015 | Beauchesne | H04L 63/1416 |
| | | | 726/23 |
| 2015/0358284 A1* | 12/2015 | Arkko | H04L 63/0227 |
| | | | 726/13 |
| 2016/0344814 A1* | 11/2016 | Yeom | H04W 4/14 |
| 2017/0118240 A1* | 4/2017 | Devi Reddy | G06N 20/00 |
| 2018/0097775 A1* | 4/2018 | Obaidi | H04L 63/0236 |
| 2018/0146001 A1* | 5/2018 | Chien | H04L 9/3247 |
| 2018/0152469 A1* | 5/2018 | Smith | H04L 63/1433 |
| 2018/0205734 A1* | 7/2018 | Wing | H04L 63/20 |
| 2018/0241763 A1* | 8/2018 | Ertugrul | H04L 69/22 |
| 2019/0089677 A1* | 3/2019 | Ashley | H04L 63/0263 |
| 2019/0124382 A1* | 4/2019 | Svensson | H04L 12/4641 |
| 2019/0273720 A1* | 9/2019 | Cloud | H04L 63/0236 |

FOREIGN PATENT DOCUMENTS

| | | | | |
|---|---|---|---|---|
| CN | 107368232 A | * | 11/2017 | |
| GB | 2458279 A | * | 9/2009 | H04L 29/06523 |
| GB | 2541969 A | * | 3/2017 | G06F 21/00 |
| WO | WO-2006069315 A1 | * | 6/2006 | H04L 41/0803 |
| WO | WO-2016061546 A1 | * | 4/2016 | G06F 21/56 |
| WO | WO-2018186053 A1 | * | 10/2018 | B60R 16/023 |

* cited by examiner

SYSTEMS AND METHODS FOR SECURE COMMUNICATION IN CLOUD COMPUTING ENVIRONMENTS

CROSS-REFERENCE TO RELATED APPLICATIONS

This application is a continuation of U.S. patent application Ser. No. 16/655,839, filed Oct. 17, 2019, which is a continuation of U.S. patent application Ser. No. 16/253,427, filed Jan. 22, 2019. The content of the foregoing applications is incorporated herein in its entirety by reference.

TECHNICAL FIELD

The present disclosure generally relates to secure communication between private networks in a public cloud network. More specifically, this disclosure relates to devices and methods for providing secure data communication channels and detecting network intrusion between private networks on a public cloud.

BACKGROUND

Computer device networks that are deployed in a cloud computing environment are typically directly connected. Such a setup results in those connections remaining within the cloud environment.

Organizations often disregard network intrusion detection setup due to lack of control in a cloud environment. Some organizations use solutions that involve deploying network intrusion detection software in each of their devices within the cloud environment or delegating network intrusion detection to a central monitoring device within the environment by duplicating and forwarding copies of all network communications to the delegated central monitoring device. Such solutions may result in increased running costs, or may divert resources away from the business purpose of the computer system. Moreover, such solutions may require specialized duplication and forwarding software on network devices. Also, in scenarios where a network device is compromised, the compromised device may be manipulated to send false data to the other devices or to the central monitoring device that thwarts the efforts for detecting a network intrusion.

In view of these and other shortcomings and problems with existing technology, improved systems and methods for secure data communication are desired.

SUMMARY

In the following description, certain aspects and embodiments of the present disclosure will become evident. It should be understood that the disclosure, in its broadest sense, could be practiced without having one or more features of these aspects and embodiments. Specifically, it should also be understood that these aspects and embodiments are merely exemplary. Moreover, although disclosed embodiments are discussed in the context of a credit card, the disclosed embodiments are not limited to any particular industry.

Disclosed embodiments include systems and methods for network intrusion detection. For instance, in some embodiments, the system may consist of a memory device. The system may consist of a first and a second network. And the system may further include one or more processors configured to execute instructions stored in the memory device to perform operations. The performed operations may comprise receiving a request from a first network of a plurality of communication devices to communicate with a second network of a second set of plurality of communication devices. The request may further comprise a destination network address associated with a second set communication device in the second network, and data to be transmitted to the destination address in the second network. The operations may further comprise analyzing the data to determine signs of network intrusion. And the operations may further comprise, when the analysis does not indicate a network intrusion determining a route to the destination network address, and forwarding the request to the destination network address in the second network. And when the analysis does indicate a network intrusion, discarding the data.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

Figure 1:
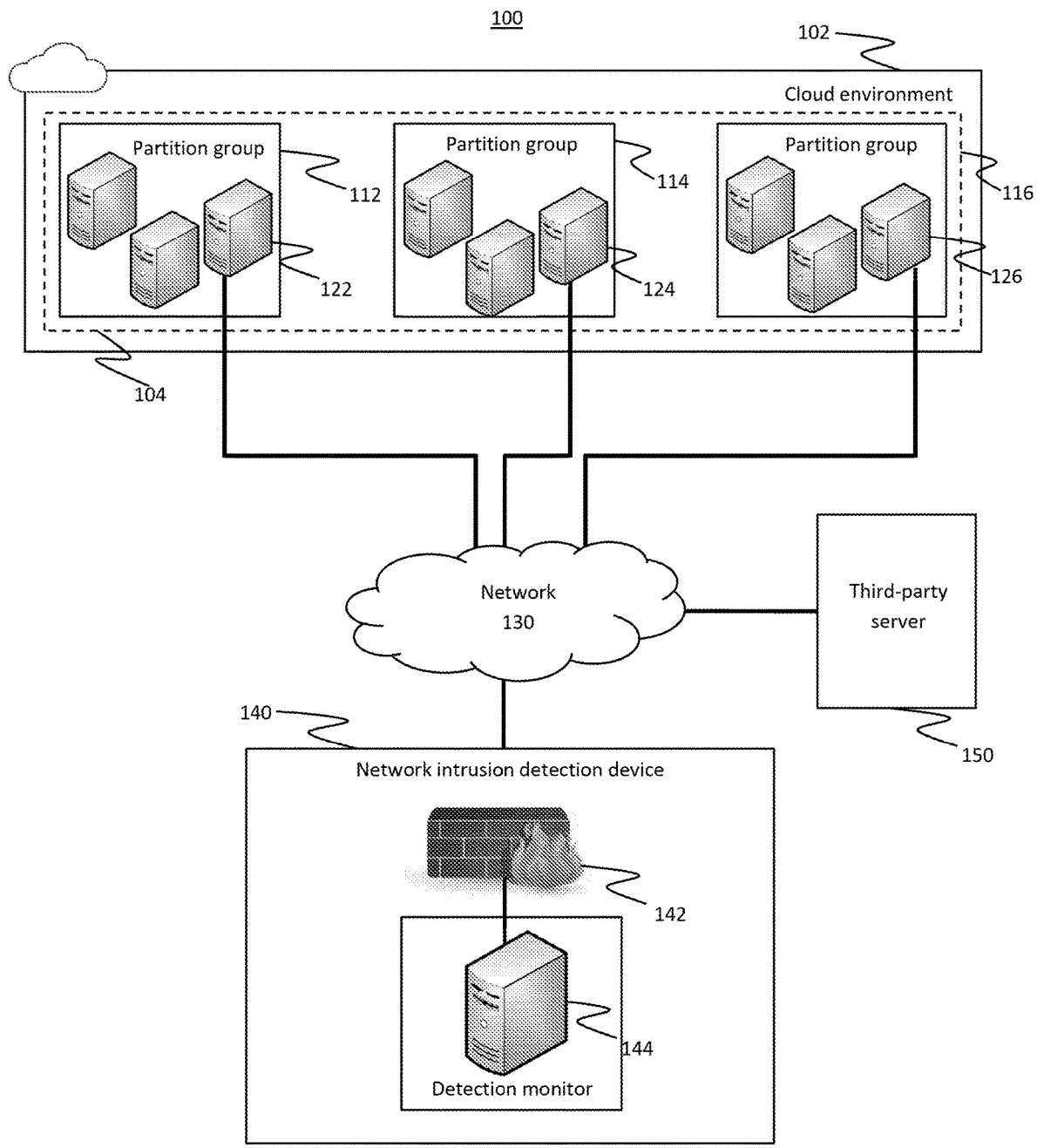
FIG. 1 is a block diagram illustrating an exemplary environment of network intrusion detection system, consistent with the present disclosure.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are neither constrained to a particular order or sequence, nor constrained to a particular system configuration. Additionally, some of the described embodiments or elements thereof can occur or be performed simultaneously, at the same point in time, or concurrently. Reference will now be made in detail to the disclosed embodiments, examples of which are illustrated in the accompanying drawings. Unless explicitly stated, sending and receiving as used herein are understood to have broad meanings, including sending or receiving in response to a specific request or without such a specific request. These terms thus cover both active forms, and passive forms, of sending and receiving.

Systems and methods consistent with the present disclosure are directed to network intrusion detection and secure data communication in a public cloud environment.

For example, previous network intrusion detection systems could be problematic to subscribers due to the lack of subscriber control of the cloud hosting provider network. Subscribers may be unable to determine and delegate resources to detection of internal network intrusion or even determination of security threats at network points of entry. Such lack of control often limited the ability of subscribers to ensure effective network security monitoring.

Some current systems provide network security at each networked communication device, or alternatively, at each network point of entry. However, the resources required to inspect network traffic at each communication device in these systems increases the running cloud costs, or diverts resources away from the business purpose of the cloud system by delegating portions of communication devices to security functions rather than storage. Additionally, when one networked communication device is compromised with intrusion packets, the device may be manipulated to send and propagate false or malicious data to the network security systems.

In other current systems, networked communication devices provide additional security by duplicating communication packets. For instance, a hosting communication device may duplicate network traffic and forward it to another communication device for analysis. Again, however, such current systems may increase consumption of network resources consumed and require specialized software on the host device. Such systems are also susceptible to the above issues caused by a compromised host device duplicating and disguising malicious communications which may further intrude and compromise a central security device.

Thus, one solution discussed herein is to partition the cloud computing environment into multiple separate networks, that is, multiple partition groups of communication devices. These partition groups may have similar architectures, features, and functions. And, communications between the partition groups may be routed outside the cloud computing environment to a separate external computing device. At this external computing device the networked traffic may be inspected by network intrusion devices or other security devices. This solution minimizes the resources devoted to security monitoring and further frees the cloud environment devices to serve their intended purposes, rather than the communication devices to additional routing and security functions. Additionally, since the network intrusion occurs outside the cloud environment and, thus may not require devoted software components in devices in the cloud system, the original communication is the material that is actually analyzed. Thus, any discarding or removal from the communication itself will be final, thus preventing copied malicious communications from propagating throughout the network.

FIG. 1 is a block diagram illustrating an exemplary system 100 for providing secure data communication, consistent with the present disclosure. As shown in FIG. 1, system 100 includes cloud environment 102, a network 130, a network intrusion detection device 140, and third party server 150. Network intrusion detection device 140 further includes firewall 142 and detection monitor 144.

As used herein, cloud environment 102 refers to a physical and virtual infrastructure of communication devices 108-120 associated with a single cloud computing service, and may include multiple partition groups 122, 124, and 126 respectively including communication devices 108-120, and connected to network 130. In some embodiments, communication devices 108-120 may take the form of servers, general purpose computers, mainframe computers, or the like. In some embodiments, communication devices 108-120 may take the form of mobile computing devices such as smartphones, tablets, laptop computers, or the like. Alternatively, communication devices 108-120 may be configured as particular apparatus, embedded systems, dedicated circuits, or the like, based on the storage, execution, and/or implementation of the software instructions that perform operations consistent with the disclosed embodiments.

Partition groups 122, 124, and 126 may divide cloud environment 102 by levels, for example, provider level, regional level, zone level, or rack level. Additionally, these partitions may be physical or logical, and may be based on different functionalities (e.g., algorithms, modules, applications, etc.) performed by different communication devices 108-120. Partition groups 122, 124, and/or 126 may be assigned a range of network addresses to accommodate associated communication devices 108-120. Partition groups 122, 124, and/or 126 may be assigned private network addresses with a single-entry point, such as communication devices 108, 114, and 120, with a public network address. Devices within a partition group may communicate with other devices in the group directly. In some embodiments, incoming network traffic may be restricted to data originating from certain network addresses and directed to specific partition groups. And, additional communication devices may be added to the partition groups based on service requests, geographic areas, network communication load, traffic and other factors. Additionally, each partition group 122, 124, and 126 may be grouped together to form distinct internal networks within cloud environment 102.

For example, in some embodiments communication devices 108-120 are grouped together by service subscription, e.g., each communication device 104, 106, and 108 in group 122 may be devoted to serving a particular subscriber. Alternatively, communication devices 108-120 may be grouped together by geographic boundaries, e.g., group 124 may be devoted to networking communication requests from a physical geographic regions or zone. Or, in some embodiments, the grouped communication devices may be physically grouped together while serving several unrelated subscribers or geographic regions, e.g., group 126 may consist of communication devices 116, 118, and 120 physically located on a rack. In some embodiments, the partitioned groups may be organized by particular algorithms and processes. Additionally, in some embodiments, the partitioned groups may be organized by IP Address ranges. One skilled in the art will recognize that embodiments of partition groups 122, 124, and 126 can be varied, mixed, and incorporate other means of grouping.

Additionally, the communication devices 108-120 may be networked together by wired or wireless means of communication. And partition groups 122, 124, and 126 may be further networked together with other partition groups, e.g., by communication (wired or wireless) between communication devices 108-120, and network 130.

It should be further noted that select communication devices 108-120 within cloud environment 102 may be further purposed with determining network traffic routes. For instance, in some embodiments, communication device 108 may be further tasked with receiving single-entry point communications from public network 130 and then further determining the appropriate routed destination within cloud environment 102. This routing may further include communications with additional communication devices 104, 106, and 108 in partition group 122, or it may include communication with other partition groups. Alternatively, the routing may include redirecting communication traffic packets to an external network intrusion device 140. The routing may be predetermined based on additional analysis, such as marshalling or unmarshalling, of the received communication, or communication devices 108-120 may determine the appropriate routed destination based on properties and characteristic traits of the received communication.

Thus, in some embodiments, cloud environment 102 may comprise multiple communication devices, spanning multiple locations, having multiple databases or multiple geographic locations associated with a single or multiple cloud storage service(s), and having multiple functions.

Cloud environment 102 may be a physical and/or virtual storage system associated with providing cloud storage services for storing data and providing access to data via a public network such as the Internet or network 130. Cloud environment 102 may include cloud services such as those offered by, for example, Amazon, Cisco, IBM, Google, Microsoft, Rackspace, or other entities.

Components of system 100 may communicate via network 130, which may comprise any type of computer networking arrangement used to exchange data. In some embodiments, network 130 may comprise one or more interconnected wired or wireless data networks that exchange data between devices such as communication devices 108-120 and detection monitor 144. And, in some embodiments, network 130 may be the Internet, a private data network, virtual private network using a public network, and/or other suitable connection(s) that enables system 100 to send and receive information between the components of system 100. Network 130 may be a secured or unsecured network. Network 130 may also include a public switched telephone network ("PSTN") and/or a wireless network such as a cellular network, WiFi network, or other known wireless networks capable of bidirectional data transmission. Network 130 may also comprise any local computer networking used to exchange data in a localized area, such as WiFi Bluetooth™ Ethernet, Radio Frequency, and other suitable network connections that enable components of system 100 to interact with one another. For example, network 130 may be implemented as, for example, the internet, a wired Wide Area Network (WAN), a wired Local Area Network (LAN), a wireless LAN (e.g., IEEE 802.11, Bluetooth, etc.), a wireless WAN (e.g., WiMAX), or the like. Each component in system 100 may communicate bi-directionally with other components of system 100 either through network 130 or through one or more direct communication links (not shown in FIG. 1).

In an exemplary embodiment, communications from cloud environment 102 are routed, by network 130, through detection monitor 144, via network intrusion detection device 140 and firewall 142. The communication may be routed from a single point of entry such as devices 108, 114, and 120, through network 130 to network intrusion detection device 140. Any communication through cloud environment 102 or with a destination within cloud environment 102 may be first routed to network intrusion detection device 140. Additionally, in some embodiments, every communication leaving communication devices 108-120 may be routed through network intrusion detection device 140. Alternatively, the communications may bypass cloud environment 102 and are routed from a third-party server through network 130 to network intrusion detection device 140 where, depending on the detection monitor 144 determination, the communication may be further routed to cloud environment 102. It should be further noted that one skilled in the art would understand that although FIG. 1 depicts network intrusion device 140 as positioned externally to cloud environment 102, device 140 may also be positioned internal to cloud environment 102.

Both firewall 142 and detection monitor 144 work to minimize network intrusion. As addressed above, both firewall 142 and detection monitor 144 may be associated externally with network intrusion detection device 140, or alternatively, firewall 142 and detection monitor 144 may be associated internally with cloud environment 102 as part of communication devices 108-120. Firewall 142 filters communication traffic entering network intrusion detection device 140 by monitoring outward network activity, such as activity outside network intrusion detection device 140 in network 130, and attempts to prevent compromised communication packets from entering the network, such as cloud environment 102 if the firewall 142 is within cloud environment 102, and/or attempts to prevent compromised communication packets from entering the device, such as network intrusion detection device 140 or alternatively communication devices 108-120. Detection monitor 144, on the other hand, detects compromised communications (already within the network and/or device) by finding malicious packets and eliminating them. Firewall 142 may be configured to protect detection monitor 144 with additional security and separation, physical or virtual, from the communication between network 130 and cloud environment 102. Firewall 142 may include a listing of all the network addresses of communication devices forwarding outgoing traffic from partition groups 122, 124, and 126. Additionally, firewall 142 may contain detection monitor 144.

Detection monitor 144 may be, in some embodiments, a software component installed in network intrusion detection device 140, or it may be a separate computing device. Detection monitor 144 will analyze received communication traffic packets of data. In some embodiments, detection monitor 144 will determine whether received communication information contains compromised packets of data that may intrude and damage system 100. In some embodiments, detection monitor 144 may use signature-based or anomaly-based criteria to detect network intrusion. Signature-based detection refers to the detection of malicious attacks by analyzing and monitoring for specific patterns, such as packet and byte sequences in network traffic or monitoring for known malicious instruction sequences used by known malware stored in detection device 140. Anomaly-based detection attempts to detect unknown attacks (i.e., malware not stored in detection device 140). Anomaly-based detection may use machine learning to create models of trustworthy activity and then continuously compare new behavior against this model.

In such instances, detection monitor 144 may further discard the compromised packets of data or the entire detected faulty communication. And, in some embodiments, detection monitor 144 will perform the methods described in FIGS. 3-4.

Although network intrusion detection device 140 and/or detection monitor 144 are depicted in FIG. 1 as outside the cloud environment 102, it should be noted that one skilled in the art would understand that these components may be situated within the cloud environment 102 as part of communication devices 108-120.

And, third party server 150 may be associated with a third party and may communicate with network intrusion detection device 140 via network 130. For instance, third-party server 150 may be a customer or subscriber of cloud services associated with cloud environment 102. Third-party server 150 may provide original communications, through network 130, to the cloud environment 102 such at single-point network entry points 108, 114, and 120. Alternatively, third-party server 150 may be associated with multiple third parties such as a subscriber and an intermediate network security organization. The third party may be, for example, an entity that manages a repository of data concerning network intrusions detected in the past or other indicators or models of known or likely network intrusion techniques. Third party server 150 may provide information to network intrusion detection device 140. For example, in some embodiments, third party server 150 may provide data indicative of patterns of intrusion that may be used by network intrusion detection device 140 to identify intrusion attempts.

Other components known to one of ordinary skill in the art may be included in system 100 to process, transmit, provide and receive information consistent with the disclosed examples. In addition, although not shown in FIG. 1, components of system 100 may communicate with each other through direct communications, rather than through network 130.

Figure 2:
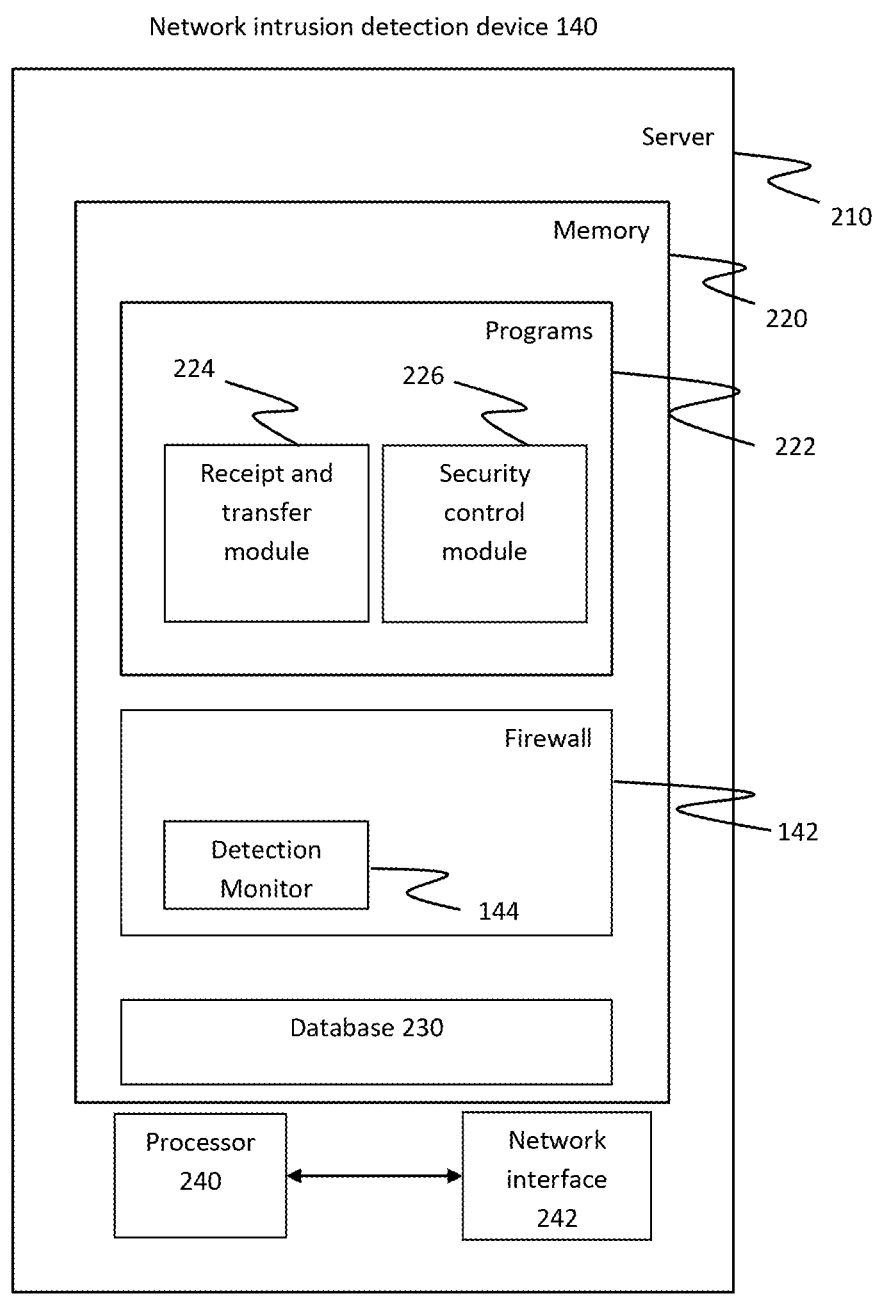
FIG. 2 is a block diagram of an exemplary network intrusion detection device, consistent with the present disclosure.

FIG. 2 is a diagram of an exemplary network intrusion detection device 140, configured to perform functions of the disclosed methods, consistent with the present disclosure. As shown in FIG. 2, device 140 may include at least one server 210; one or more memory devices 220; programs 222 including, for example, a security control module 226 and a receipt and transfer module 224; a firewall 142 and detection monitor 144; one or more databases 230; one or more processors 240; and a network interface 242.

Server 210 may be a single server or may be configured as a distributed computer system including multiple servers or computers (e.g., server clusters and/or cloud service) that interoperate to perform one or more of the processes and functionalities associated with the disclosed embodiments.

Memory 220 may include one or more memory devices that store data and instructions used to perform operations of the disclosed embodiments. For example, memory 220 may represent a tangible and non-transitory computer-readable medium having stored therein computer programs, sets of instructions, code, or data to be executed by processor 240. Memory 220 may include, for example, a removable memory chip (e.g., EPROM, RAM, ROM, DRAM, EE PROM, flash memory devices, or other volatile or non-volatile memory devices) or other removable storage units that allow instructions and data to be accessed by processor 240.

Memory 220 may also include instructions that, when executed by processor 240, perform operations consistent with the functionalities disclosed herein. Methods, systems, and devices consistent with disclosed embodiments are not limited to separate programs or computers configured to perform dedicated tasks. For example, memory 220 may include one or more programs 222 to perform one or more functions of the disclosed embodiments. Further, in some embodiments, programs 222 may consist of receipt and transfer module 224 and security control module 226.

Receipt and transfer module 224 may further unmarshall the received communication and data payload before passing the communication payload to security control module 226 for review. Receipt and transfer module 224 may unmarshall the received communication into a form and representation that is executable by security control module 226. Receipt and transfer module 224 may be a computer program that takes the serialized marshalled packet and transforms it into an executable format. Security control module 226 may review the unmarshalled communications, and their data payloads, on network 130 between cloud environment 102, network intrusion detection device 140, third party server 150, and other components of system 100 to detect markers indicating the unmarshalled communication was checked by monitoring device 144.

A network intrusion may maliciously manipulate the communication data payload, thus the security control module 226 may search for specific markers indicating the data payload was not reviewed by monitoring device 144. If the security control module 226 determines a communication was not reviewed by monitoring device 144 then the security control module 226 will further transmit the executable packet of data through firewall 142 to monitoring device 144.

Moreover, processor 240 may execute programs located remotely from device 140. For example, network intrusion detection device 140 may access remote programs, that, when executed, perform functions related to disclosed embodiments.

In some embodiments, memory 220 may also contain firewall 142. Firewall 142 may be configured to protect detection monitor 144 with additional security and separation from the communication between network 130 and cloud environment 102. Firewall 142 may include listing of all the network addresses of communication devices forwarding outgoing traffic from partition groups 122, 124, and 126. Additionally, firewall 142 may contain detection monitor 144.

Memory 220 may also include database 230. Database 230 may be any combination of one or more relational and/or non-relational databases such as document management systems, Microsoft SQL™ databases, SharePoint™ databases, Oracle™ databases other relational databases, or non-relational databases such as Apache HBase™. Database 230 may be a volatile or non-volatile, magnetic, semiconductor, tape, optical, removable, nonremovable, or other type of storage device or tangible (i.e., non-transitory) computer readable medium. For example, database 230 may include at least one of a hard drive, a flash drive, a memory, a Compact Disc (CD), a Digital Video Disc (DVD), or a Blu-ray™ disc. In some embodiments, database 230 may comprise of an associative array architecture, such as a key-value storage, for storing and rapidly retrieving large amounts of information. Additionally, in some embodiments database 230 may contain a reference table containing all network addresses associated with communication through network 130. Database 230 may also be communicatively connected to one or more remote memory devices (e.g., databases (not shown)) through network 130, or a different network). Remote memory devices may be configured to store information and may be accessed and/or managed by system 100. Systems and methods consistent with disclosed examples, however, are not limited to separate databases or even to the use of a database.

Processor 240 may be one or more known or custom processing devices designed to perform functions of the disclosed methods, such as a single core or multiple core processors capable of executing parallel processes simultaneously. For example, processor 240 may be configured with virtual processing technologies. In certain embodiments, processor 240 may use logical processors to simultaneously execute and control multiple processors. Processor 240 may be implemented as virtual machine, or other known technologies to provide the ability to execute, control, run, manipulate, store, etc. multiple software processes, applications, programs, etc. In another embodiment, processor 240 may include multiple-core processor arrangement (e.g., dual core, quad core, etc.) configured to provide parallel processing functionalities to allow network intrusion detection device 140 to execute multiple processes simultaneously. One of ordinary skill in the art would understand that other types of processor arrangements could be implemented that provide for the capabilities disclosed herein.

Network interface 242 may be implemented as one or more devices for receiving signals or input from devices and providing signals or output to devices that allow data to be received and/or transmitted by network intrusion detection device 140. Network interface 242 may include components capable of communicating wirelessly or through wires.

Figure 3:
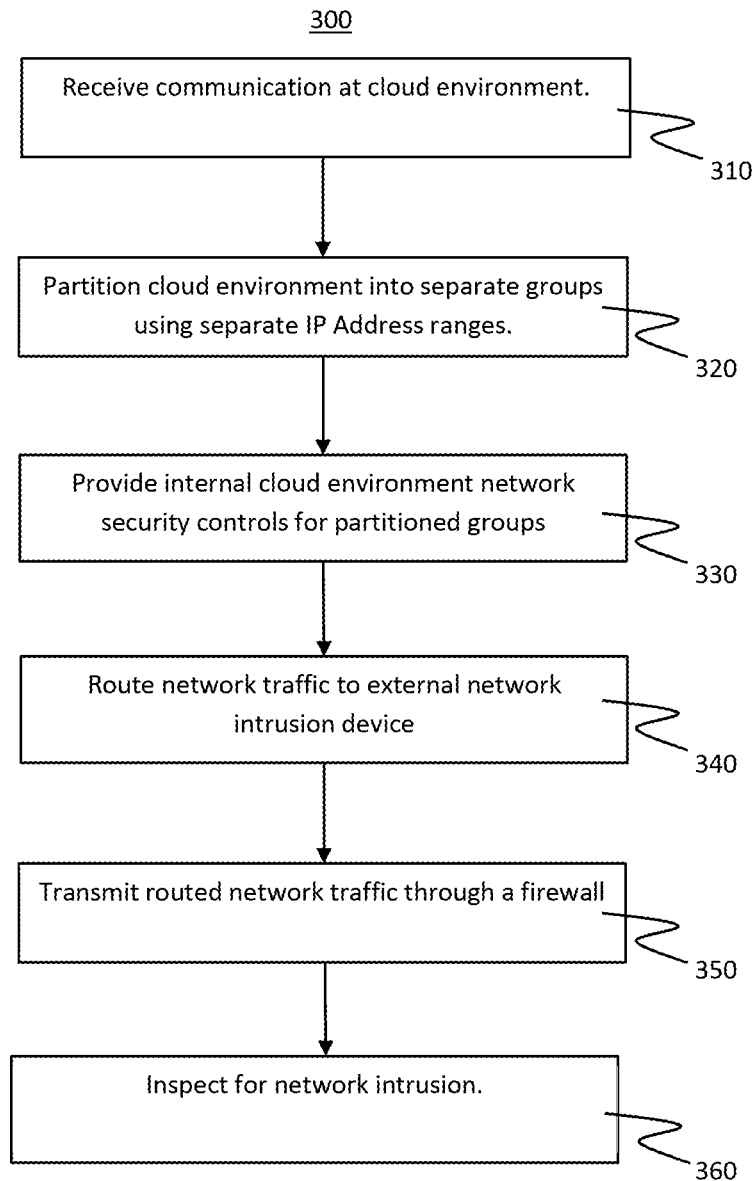
FIG. 3 is a flowchart of a method for network intrusion detection in a public cloud environment, consistent with the present disclosure.

FIG. 3 is a flowchart of an exemplary method 300 for configuring system 100 in a public cloud environment. In method 300, system 100 performs functions that provide security and threat detection of dangerous network communications by monitoring the network communication traffic between communication devices 108-120 within cloud environment 102.

In step 310, cloud environment 102 receives a network communication and determines its routing destination. The network communication, in some embodiments, may be received from network 130 and/or third-party server 150 as discussed herein. The communication may have a predetermined communication device 108, 114, 120 destination within cloud environment 102 or, alternatively, the cloud environment may determine the communication be routed to particular partition groups 122, 124, and/or 126. The communication may require additional processing such as marshalling and/or unmarshalling to further determine the appropriate routed destination. Additionally, as contemplated throughout here, the network communication may contain packets of information designed to intrude and compromise the cloud environment 102.

In some embodiments, determining a routing destination may further include recording the network address where the traffic should be sent (if predetermined or determined at step 310). The recorded network addresses can be further stored in a communication device 108, 114, 120 tasked with handling step 310 receiving and routing as discussed herein. As discussed, the recorded network address may be for a destination within cloud environment 102 or a destination outside environment 102 such as third party server 150. In some embodiments, the recorded network addresses may be saved as a reference and/or routing table for future reference. System 100, at step 310, a single communication device (i.e., 108) may be tasked with establishing routes or multiple communication devices (i.e., 108, 114, and/or 120) may be tasked. Additionally, a single or set of communication devices may be further tasked with routing traffic through network 130 to third-party server 150 or external network intrusion detection device 140.

In step 320, communication devices 108-120 of cloud environment 102 are partitioned into groups based on functionalities and levels discussed herein. In particular, step 320, as depicted, contemplates partitioning the communication devices 108-120 into groups based on IP address ranges, however, it will be understood by those skilled in the art that this is not the only means of partitioning the groups. The partitioning may be based on different functionalities performed by different communication devices 108-120, or other such factors discussed throughout here. In some embodiments, the cloud environment provider will determine the partition group distinctions to best assist the customers and handling network traffic flow which may require new designations. New devices may be added to the partition groups based on network load, traffic and other factors. Additionally, it will also be understood by one skilled in the art that additional partition groups and/or additional communication devices will require partitioning as discussed by step 320.

Communication devices within a partition group, e.g., 104, 106, and 108, may communicate with other devices in the group directly which further increases the potential harm of network intrusion. Thus, in some embodiments, step 320, as depicted, may partition groups of communication devices 108-120 by assigned private network addresses with a single-entry point with a public network address. And, incoming network traffic may be restricted to data originating from certain network addresses, or alternatively, detection monitor 144 may utilize this IP address information to further detect network intrusions and monitor the communication traffic.

In step 330, internal security controls are provided for communication devices groups in cloud environment 102 to protect network traffic communication. In some embodiments, security controls may involve firewall and positioning, physically or logically, the communication devices of a respective partition group behind the firewall. The security controls may manage and route network traffic communication within cloud environment 102 from private network access points, as well as, public network access points, and internal communication between partition groups 122, 124, and/or 126. The internal cloud environment-provided security controls may further minimize compromised network communication before further intrusion within partition groups or cross partition groups occurs. For example, in some embodiments, security controls may also involve restricting the communication devices in partition groups to private network addresses. Additionally, in some embodiments, security controls may involve restricting network communication outside a respective partition group to the subset of communication devices in that respective partition group, e.g., communication between 110, 112, and 114.

In Step 340, the received network communications are routed from their respective internal cloud environment 102 locations (i.e., partition groups 122, 124, and/or 126) to external network intrusion device 140. Like step 310, determining a routing may further include recording the destined network address. Recorded network addresses can be further stored in a communication device 108-120 tasked with handling routing as discussed herein. In some embodiments, the recorded network addresses may be saved as a routing table for future reference. Further, a single communication device (i.e., 108) may be tasked with establishing routes or multiple communication devices (i.e., 108, 114, and/or 120) may be tasked. Additionally, a single or set of communication devices may be tasked with routing traffic through network 130 to external network intrusion detection device 140.

In step 350, firewall 142 protects detection monitor 144 by transmitting and screening routed network traffic from cloud environment 102 to network intrusion detection device 140. Additionally, in some embodiments, network intrusion detection device 140 may further include recorded network addresses which also may be saved as a routing table for future reference. The routing table may include all routed communication traffic, from received data at step 310, to routed data at step 340, and traffic transmitted through firewall 142, including data routed from partition groups 122, 124, and/or 126.

In step 360, the transmitted network traffic is inspected for network intrusion with detection monitor 144 by means discussed herein. Like firewall 142, detection monitor 144 further protects the system by preventing network intrusions from prorogating throughout network 130. Detection monitor 144 inspects received communication and searches for signs of network intrusion. Signs may include malicious activity or network policy violations. Additionally, in some embodiments, detection monitor 144 may inspect for network intrusion by using alarm filtering techniques to distinguish intrusion, compromised data, or malicious activity from false positives. In such instances, detection monitor 144 may further discard the compromised packets of data or the entire detected faulty communication.

Figure 4:
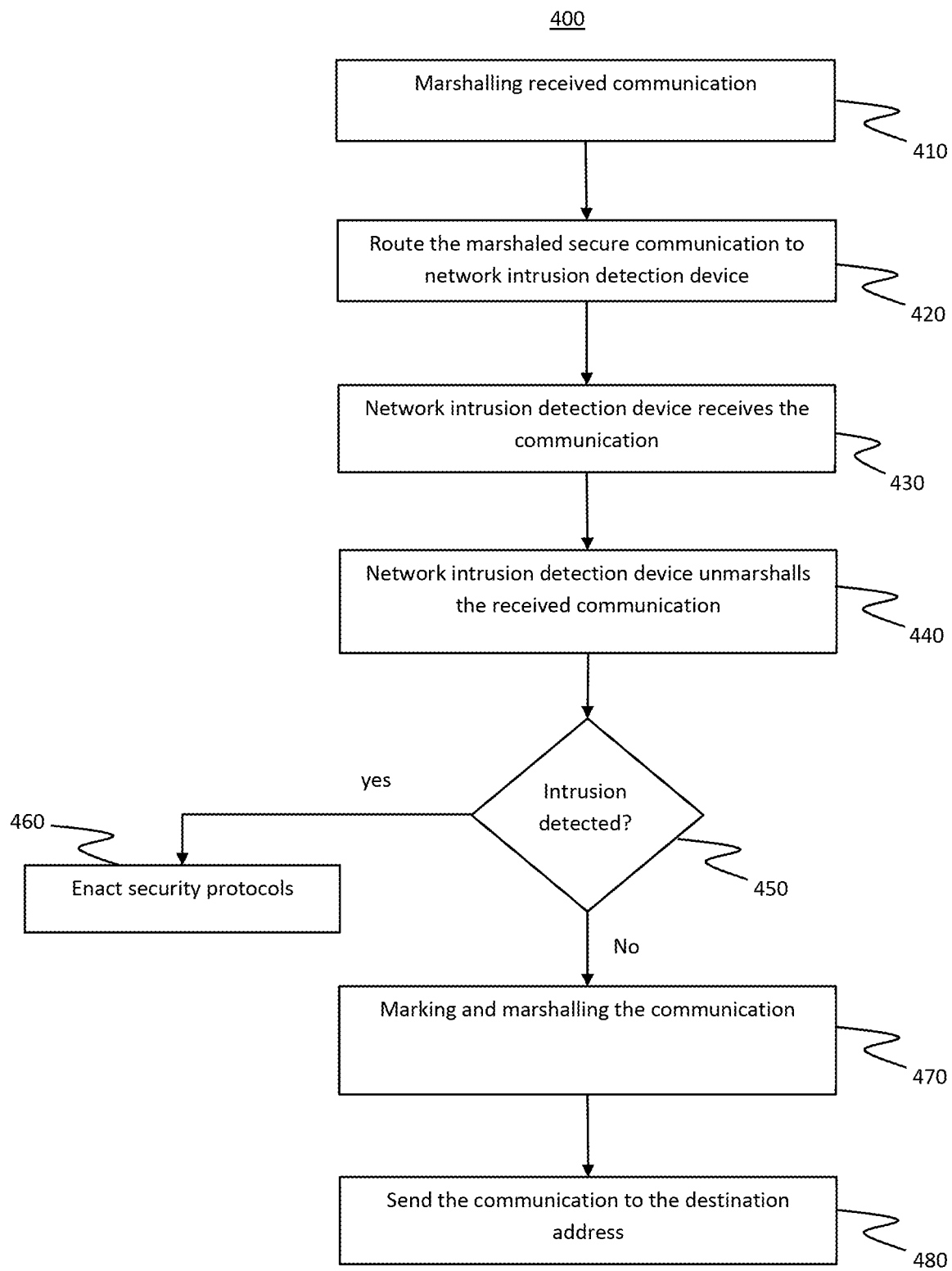
FIG. 4 is a flowchart of a method for providing secure communication between private networks in a cloud environment.

FIG. 4 is a flowchart of a method 400 for providing secure communication between networks in a cloud environment.

In step 410, a communication device attempts secure network communication with other communication devices by marshalling a traffic data payload with a destination address. The communication device may be any device 108-120 discussed herein. For example, the communication device may be network single-point network entry device 108 (associated with partition group 122) with originate traffic from network 130. The communication device may be part of partition group such as devices associated with partition groups 122, 124, and/or 126. The communication device may be devoted to various functions or combination of functions such processing traffic data, routing traffic data, storing data, and other functions discussed herein. In some embodiments, the communication device may "delegate," that is, send the communication payload to another device within its network for marshalling the payload. The communication device may be further associated with means for securing network traffic such as firewall 142 and detection monitor 144 (see step 420).

The network communication may originate from an outside network source or from an internal network source. For example, in some embodiments, the network communication may be received by communication device 108 from a public access network 130, or the communication may be received from an internal network such as partition group 124 and/or 126. The original communication may arrive from a secure or unsecure source. Once received, the communication device will attempt to securely route the communication to the destination address which may be within the same network as communication device (other communication devices 104, 106, and 108 within partition group 122), within other cloud environment internal networks such as groups 124 and/or 126, or to other networks outside cloud environment such as third-party server 150 via network 130. The communication device will attempt to communicate the traffic payload by secure means, which if received from a secure source then the device will attempt to maintain the integrity of the traffic packet, or alternatively, if received from an unsecure source then the device may attempt to secure the communication through means described herein such as firewall 142 and detection monitor 144 (see step 420).

Additionally, the communication packet may require the communication device to marshal the payload. Marshalling is a process of transforming the payload packet to a data packet suitable for storage or transmission depending on the destination address (i.e., if the communication device itself is the destination then the packet will be marshalled into a packet suitable for storage, whereas, if another device is the destination then the traffic is marshaled into a packet suitable for transmission). In some embodiments, the communication device may need to communicate with other devices in more than one network (i.e., internal cloud environment 102 partition groups 122, 124, and/or 126) and thus may marshal transmission routing network addresses of all destination devices in the other networks. The communication device may delegate the marshalling to other communication devices within its network or outside the network. Alternatively, in some embodiments, the communication device may receive, as part of the original communication receipt, delegated marshalling. The delegation of marshalling between communication devices 104, 106, and 108 in one particular network (such as partition group 122), or the delegation of marshalling to other networked devices may improve the processing resources, network functions, and security features as discussed herein. For instance, one communication, such as device 108, may be tasked with delegation and routing traffic based on the networked devices' functions to efficiently secure, transmit, and store communication payloads.

Moreover, the received communication packet may be part of a series of received, or anticipated reception, packets of data. In some embodiments, only the first of the series of communication payloads may include a destination address, thus requiring the receiving communication device to store the destination addresses for successive payloads.

Network intrusion may occur for any of the above discussed network communications; such as communications between separate networks in cloud environment 102 such as partition groups 122, 124, and 126, or communications from network 130, etc. Thus, one skilled in the art will further understand the importance of separate network intrusion security, like network intrusion device 140, that further monitors communications within the networks. For instance, a network intrusion attempt may first occur when the networked devices first receive a communication, or alternatively, the intrusion may be detected later after subsequent recorded security protocols indicate a malicious byte sequence. One skilled in the art will further understand that network intrusion can occur in communications within the internal networks or at the external network communication segments.

In step 420, the delegated communication device, e.g., 108, routes the marshalled communication payload to network intrusion detection device 140. For example, in some embodiments, depending on the determined delegation and routing traffic, the recipient device from step 410 may send the marshaled communication payload to network intrusion detection device 140 via an intermediate delegated device.

In some embodiments, the communication device assigned with delegating and routing functions from step 410, e.g., device 108, will determine whether the marshalled communication payload was secured by intrusion detection device 140 or not. If the communication was not secured by intrusion detection device 140 then the marshalled communication will be routed to network intrusion device 140. Otherwise, the marshalled communication may be sent to the destination address (see step 480).

In Step 430, network intrusion detection device 140 receives the marshalled communication payload. Network intrusion detection device 140 may be part of a communication device from the network from step 410 (e.g. communication device 108 from partition group 122), or part of a separate networked communication group such as partition groups 124 and/or 126; it may be part of a communication device outside partition groups 122, 124, and/or 126 yet still part of cloud environment 102; or it may be outside the cloud environment 102 as part of a private network such as third-party server 150 or a private service provider. Additionally, the received marshalled communication payload may further contain a destination address which may be stored in database 230.

In step 440, network intrusion device 140 unmarshalls the communication payload and prepares the communication packet for network intrusion analysis. For example, in some embodiments, server 210 of network intrusion detection device 140 request receipt and transfer module 224 to unmarshall the received communication and pass the communication payload to security control module 226 for review. Receipt and transfer module 224 may unmarshall the received communication into a form and representation that is executable by security control module 226. Receipt and transfer module 224 may be a computer program that takes the serialized marshalled packet and transforms it into an executable format.

In step 450, intrusion detection device 140 determines whether the unmarshalled communication packet contains suspicious data. In some embodiments, intrusion detection device 140 may receive the communication at receipt and transfer module 224 which in turn transmits the unmarshalled data to security control module 226. Security control module 226 reviews the communication payload to detect any potential network intrusion by searching for detection monitor 144 markers. A network intrusion may maliciously manipulate the communication payload and compromise the data. Thus, the review in step 450 may include checking for these detection monitor 144 markers in the data packet to further narrow potential compromised data and network intrusion. Further, if no detection monitor 144 markers are found then security module 226 may transmit the data to firewall 142 and detection monitor 144 for review.

As discussed herein, firewall 142 and detection monitor 144 will attempt to maintain network security by monitoring for malicious and compromised payload packets. In some embodiments, firewall 142 may further include listing of all the network addresses of communication devices forwarding outgoing traffic from partition groups 122, 124, and 126. In some embodiments, the communication payload may be analyzed by detection monitor 144 only if firewall 142 sees the address of the originating device in an allowed network address list of a routing and reference table.

Detection monitor 144 may determine whether the unmarshalled communication contains compromised packets of data that may intrude and damage system 100. In some embodiments, detection monitor 144 may use signature-based or anomaly-based criteria to detect network intrusion. Signature-based detection refers to the detection of malicious attacks by analyzing and monitoring for specific patterns, such as communication protocols; data contained within packets like identified sources and destinations, conversation flags, and message language prompts; volume of packets and bytes; sequences in network traffic; fragmentation of data packets; or monitoring for known malicious instruction sequences used by known malware stored in database 230. Additionally, the "signature" patterns may further include analyzing the communication time of day, amount of data, type of data, etc. Anomaly-based detection attempts to detect unknown attacks (i.e., malware not stored in database 230). Anomaly-based detection may use machine learning to create models of trustworthy activity and then continuously compare new behavior against this model to identify outlying data points.

If the answer to step 450 is yes, then at step 460 method 400 enacts security protocols. In some embodiments, method 400 may enact security protocols that eliminate the security threat and intrusion data by discarding the entire unmarshalled communication payload. The method 400 may further eliminate all traces of the original received communication, including the marshalled communications from step 410. In some embodiments, the security protocols may entail only discarding the unmarshalled data packet where network intrusion has been detected and proceeding on to step 470 with the remaining uncompromised data packets. Additionally, in some embodiments the security protocol may further include maintaining and/or updating database 230 with records of the attempted network intrusion and compromised data. The records of database 230 may be further transmitted to third-party server 150 for additional reporting and record keeping.

If the answer to step 450 is no, then method 400 proceeds to step 470 to mark and marshal the communication. In some embodiments, after analyzing the unmarshalled payload at step 450, the detection monitor 144 may further mark the payload. This mark may include the step 450 determination (e.g., whether the payload was partially discarded or if the payload was secure), or the mark may merely indicate that the payload was reviewed by detection monitor 144.

In some embodiments, receipt and transfer module 224 may re-marshal the communication payload for preparation to transfer and/or store the communication in the communication device with the original destination address. Alternatively, the delegating communication device from step 410, to minimize resources or further improve the network performances, may further delegate the marshalling task to another communication device.

Additionally, in some embodiments the marshalling may further include a communication device determining the appropriate networked routing for the communication. Determining the appropriate networked route may further include the communication device reviewing routing tables (e.g., tables stored in database 230) for the connected networks.

In Step 480, the communication is sent to the destination device. The communication, in some embodiments, may consist of the marked and marshalled data from step 470. Alternatively, in some embodiments, the communication may consist of the data from step 420. Additionally, as discussed herein, the communication may originate from a private external networked address, or the communication may be further associated with an external private destination networked address. Alternatively, the communication may originate from an internal networked address (e.g., from any partition group in cloud environment 102) and routed to another internal networked address. Also, one skilled in the art will further understand that the communication may be associated with combinations of private, external, and internal networked addresses.

Additionally, in some embodiments, the communication may consist of a series of routed traffic packets. Only the first of the traffic packet series may include the destination address, and as described herein, the final destination for the entire packet series may be stored in database 230 or any like database of communication devices 108-120. Thus, network intrusion detection device 140, or similarly delegated communication devices 108-120, may further record the destination of the entire successive payload packet.

Various operations or functions are described herein, which may be implemented or defined as software code or instructions. Such content may be directly executable ("object" or "executable" form), source code, or difference code ("delta" or "patch" code). Software implementations of the embodiments described herein may be provided via an article of manufacture with the code or instructions stored thereon, or via a method of operating a communication interface to send data via the communication interface. A machine or computer readable storage medium may cause a machine to perform the functions or operations described and includes any mechanism that stores information in a form accessible by a machine (e.g., computing device, electronic system, and the like), such as recordable/non-recordable media (e.g., read only memory (ROM), random access memory (RAM), magnetic disk storage media, optical storage media, flash memory devices, and the like). A communication interface includes any mechanism that interfaces to any of a hardwired, wireless, optical, and the like, medium to communicate to another device, such as a memory bus interface, a processor bus interface, an Internet connection, a disk controller, and the like. The communication interface can be configured by providing configuration parameters and/or sending signals to prepare the communication interface to provide a data signal describing the software content. The communication interface can be accessed via one or more commands or signals sent to the communication interface.

The present disclosure also relates to a system for performing the operations herein. This system may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CDROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Embodiments of the present disclosure may be implemented with computer executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments may include different computer-executable instructions or components having more or less functionality than illustrated and described herein.

Computer programs based on the written description and methods of this specification are within the skill of a software developer. The various programs or program modules can be created using a variety of programming techniques. For example, program sections or program modules can be designed by means of JavaScript, Scala, python, Java, C, C++, assembly language, or any such programming languages, as well as data encoding languages (such as XML, JSON, etc.), query languages (such as SQL), presentation-related languages (such as HTML, CSS etc.) and data transformation language (such as XSL). One or more of such software sections or modules can be integrated into a computer system, non-transitory computer readable media, or existing communications software.

The words "comprising," "having," "containing," and "including," and other similar forms are intended to be equivalent in meaning and be interpreted as open ended, in that, an item or items following any one of these words is not meant to be an exhaustive listing of such item or items, or meant to be limited to only the listed item or items. In addition, the singular forms "a," "an," and "the" are intended to include plural references, unless the context clearly dictates otherwise.

Having described aspects of the embodiments in detail, it will be apparent that modifications and variations are possible without departing from the scope of aspects of the invention as defined in the appended claims. As various changes could be made in the above constructions, products, and methods without departing from the scope of aspects of the invention, it is indented that all matter contained in the above description and shown in the accompanying drawings shall be interpreted as illustrative and not in a limiting sense.

What is claimed is:

1. A system for secure data communications, comprising:
an external detection device; and
a cloud environment associated with a cloud computing service, comprising:
one or more memory devices;
a first set of partitioned communication devices;
a second set of partitioned communication devices; and
one or more processors executing instructions stored in the one or more memory devices to perform operations comprising:
receiving, at the first set of partitioned communication devices, out-bound data for the second set of partitioned communication devices, wherein devices in the first set of partitioned communication devices are prevented from directly communicating with other communication devices outside of the first set of partitioned communication devices by rejecting direct inbound data communication from the other communication devices;
routing the out-bound data from the first set of partitioned communication devices to the external detection device; and
causing the external detection device to;
analyze the out-bound data, and
selectively forward at least a portion the out-bound data that has been analyzed by the external detection device to the second set of partitioned communication devices.

2. The system of claim 1, wherein routing the out-bound data further comprises adding a destination network address to the out-bound data.

3. The system of claim 1, wherein causing the external detection device to selectively forward at least the portion of the out-bound data further comprises;
adding an address of an originating communication device, wherein communication traffic received by the first set of partitioned communication devices is further associated with the originating communication device.

4. The system of claim 3, wherein only a first data communication from the originating communication device contains the address.

5. The system of claim 1, wherein the external detection device is in a geographically different location from the first set of partitioned communication devices and the second set of partitioned communication devices.

6. The system of claim 1, wherein causing the external detection device to analyze the out-bound data comprises:
causing the external detection device to review addresses of allowed networked addresses.

7. The system of claim 1, wherein causing the external detection device to analyze the out-bound data comprises:
causing the external detection device to discard a particular portion of the out-bound data having signs of network intrusion.

8. The system of claim 1, wherein causing the external detection device to selectively forward the out-bound data comprises:
causing the external detection device to transmit at least the portion of the out-bound data to a communication device in a third set of partitioned communication devices of the cloud environment.

9. A method comprising:
- receiving, at a first set of partitioned communication devices of a cloud environment, out-bound data directed to a second set of partitioned communication devices of the cloud environment, wherein devices in the first set of partitioned communication devices are prevented from directly communicating with other communication devices outside of the first set of partitioned communication devices by rejecting direct inbound data communication from the other communication devices;
- routing the out-bound data from the first set of partitioned communication devices to an external detection device, the external detection device is external to the cloud environment; and
- causing the external detection device to analyze the out-bound data and selectively forward at least a portion the out-bound data that has been analyzed by the external detection device to the second set of partitioned communication devices.

10. The method of claim 9, wherein routing the out-bound data further comprises adding a destination network address to the out-bound data.

11. The method of claim 9, wherein causing the external detection device to selectively forward at least the portion of the out-bound data further comprises:
- adding an address of an originating communication device, wherein communication traffic received by the first set of partitioned communication devices is further associated with the originating communication device.

12. The method of claim 11, wherein only a first data communication from the originating communication device contains the address.

13. The method of claim 9, wherein the external detection device is in a geographically different location from the first set of partitioned communication devices and the second set of partitioned communication devices.

14. The method of claim 9, wherein causing the external detection device to analyze the out-bound data comprises:
- causing the external detection device to review addresses of allowed networked addresses.

15. The method of claim 9, wherein causing the external detection device to analyze the out-bound data comprises:
- causing the external detection device to discard a particular portion of the out-bound data having signs of network intrusion.

16. The method of claim 9, wherein causing the external detection device to selectively forward the out-bound data comprises:
- causing the external detection device to transmit at least the portion of the out-bound data to a communication device in a third set of partitioned communication devices.

17. One or more non-transitory computer-readable storage media storing instructions that when executed by one or more processors cause the one or more processors to perform operations comprising:
- receiving, at a first set of partitioned communication devices of a network environment, out-bound data directed to a second set of partitioned communication devices of the network environment, wherein devices in the first set of partitioned communication devices are prevented from directly communicating with other communication devices outside of the first set of partitioned communication devices by rejecting direct inbound data communication from the other communication devices;
- routing the out-bound data from the first set of partitioned communication devices to an external detection device; and
- causing the external detection device to analyze the out-bound data and selectively forward at least a portion the out-bound data that has been analyzed by the external detection device to the second set of partitioned communication devices.

18. The one or more non-transitory computer-readable storage media of claim 17, wherein routing the out-bound data further comprises;
- adding a destination network address to the out-bound data.

19. The one or more non-transitory computer-readable storage media of claim 17, wherein causing the external detection device to selectively forward at least the portion of the out-bound data further comprises;
- adding an address of an originating communication device, wherein communication traffic received by the first set of partitioned communication devices is further associated with the originating communication device.

20. The one or more non-transitory computer-readable storage media of claim 19, wherein only a first data communication from the originating communication device contains the address.

* * * * *